(12) United States Patent
Surampudi et al.

(10) Patent No.: US 11,901,759 B2
(45) Date of Patent: Feb. 13, 2024

(54) DEVELOPMENT OF FAST CHARGE PROFILES FOR LITHIUM-ION BATTERIES

(71) Applicant: Southwest Research Institute, San Antonio, TX (US)

(72) Inventors: Bapiraju Surampudi, San Antonio, TX (US); Shuvodeep Bhattacharjya, San Antonio, TX (US); Kevin Jones, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 389 days.

(21) Appl. No.: 17/378,577

(22) Filed: Jul. 16, 2021

(65) Prior Publication Data

US 2023/0015318 A1    Jan. 19, 2023

(51) Int. Cl.
*H02J 7/00* (2006.01)
*B60L 58/10* (2019.01)
*H01M 10/44* (2006.01)
*H01M 10/48* (2006.01)

(52) U.S. Cl.
CPC ...... *H02J 7/007182* (2020.01); *H02J 7/0048* (2020.01); *H02J 7/00714* (2020.01); *B60L 58/10* (2019.02); *H01M 10/44* (2013.01); *H01M 10/48* (2013.01); *H01M 2220/00* (2013.01)

(58) Field of Classification Search
CPC ............... H02J 7/007182; H02J 7/0048; H02J 7/00714; B60L 58/10; H01M 10/44; H01M 10/48; H01M 2220/00
USPC ....... 320/161, 110, 124, 125, 126, 142, 144, 320/162, 164
See application file for complete search history.

(56) References Cited

U.S. PATENT DOCUMENTS

| | | | | |
|---|---|---|---|---|
| 5,157,321 | A * | 10/1992 | Kato | H02J 7/2434 322/73 |
| 9,276,293 | B2 * | 3/2016 | Xu | H01M 10/058 |
| 2008/0061746 | A1 * | 3/2008 | Kobayashi | H02M 3/33507 315/291 |
| 2008/0238363 | A1 * | 10/2008 | Bourilkov | H02J 7/0071 320/107 |
| 2011/0037439 | A1 * | 2/2011 | Bhardwaj | H01M 10/0525 320/152 |
| 2012/0043929 | A1 * | 2/2012 | Yazami | H02J 7/007184 320/160 |

(Continued)

FOREIGN PATENT DOCUMENTS

KR    101985812 B1 *  6/2019 ............... H02J 7/00

OTHER PUBLICATIONS

Andrenacci et al., "Modelling charge profiles of electric vehicles based on charges data", version 3, Open Res Eur, 2021, 67 pages. (Year: 2021).*

(Continued)

*Primary Examiner* — Phallaka Kik
(74) *Attorney, Agent, or Firm* — Livingston Law Firm

(57) ABSTRACT

A method of developing a charging profile for charging a lithium-ion battery. A first phase of charging is at a constant current level, with the constant current level selected on the basis of battery resistance during charging and differential voltage (dV/dQ) analysis. A switch point is selected on the basis of a state of charge (SOC) of the battery when dV/DQ values increase. Next is an increasing voltage charging phase, with the voltage rate selected on the basis of charge acceptance and charge time.

4 Claims, 4 Drawing Sheets

(56) References Cited

U.S. PATENT DOCUMENTS

| | | | | |
|---|---|---|---|---|
| 2013/0200850 A1* | 8/2013 | Ke | ........................ | H02J 7/0016 320/118 |
| 2015/0060290 A1* | 3/2015 | Xu | ........................ | H01M 10/44 205/82 |
| 2021/0359536 A1* | 11/2021 | Johnson | ................ | H01M 10/44 |

OTHER PUBLICATIONS

Barai et al., "A comparison of methodologies for the non-invasive characterisation of commercial Li-ion cells", Progress in Energy and Combustion Sciences, vol. 72, May 2019, pp. 1-31. (Year: 2019).*

* cited by examiner

DEVELOPMENT OF FAST CHARGE PROFILES FOR LITHIUM-ION BATTERIES

TECHNICAL FIELD OF THE INVENTION

This invention relates to lithium-ion batteries, and more particularly to methods of charging such batteries.

BACKGROUND OF THE INVENTION

A lithium-ion battery is a type of rechargeable battery. Lithium-ion batteries are used for diverse applications such as portable electronics and electric vehicles and are growing in popularity for many additional applications.

In these batteries, lithium ions move from a negative electrode through an electrolyte to a positive electrode during discharge, and back when charging. Lithium-ion batteries use an intercalated lithium compound as the material at the positive electrode and typically graphite at the negative electrode.

Research is ongoing for lithium-ion batteries in areas such as battery life extension, energy density, safety, cost reduction, and charging speed. One field of research is investigation of how to charge the batteries quickly without compromising safety or battery usefulness and longevity.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to methods for fast charging of lithium-ion batteries. A charging method described herein combines a constant current phase at lower states of charge (SOC) and an increasing voltage phase as the SOC increases.

This combination of charging phases provides a charging profile that minimizes charging time and battery deterioration while maximizing the amount of charge applied. As used herein, the "charging profile" refers to a constant current that switches, at a predetermined switch point, to an increasing voltage. The constant current, the switch point, and the rate of voltage increase are each determined as described herein.

Figure 1:
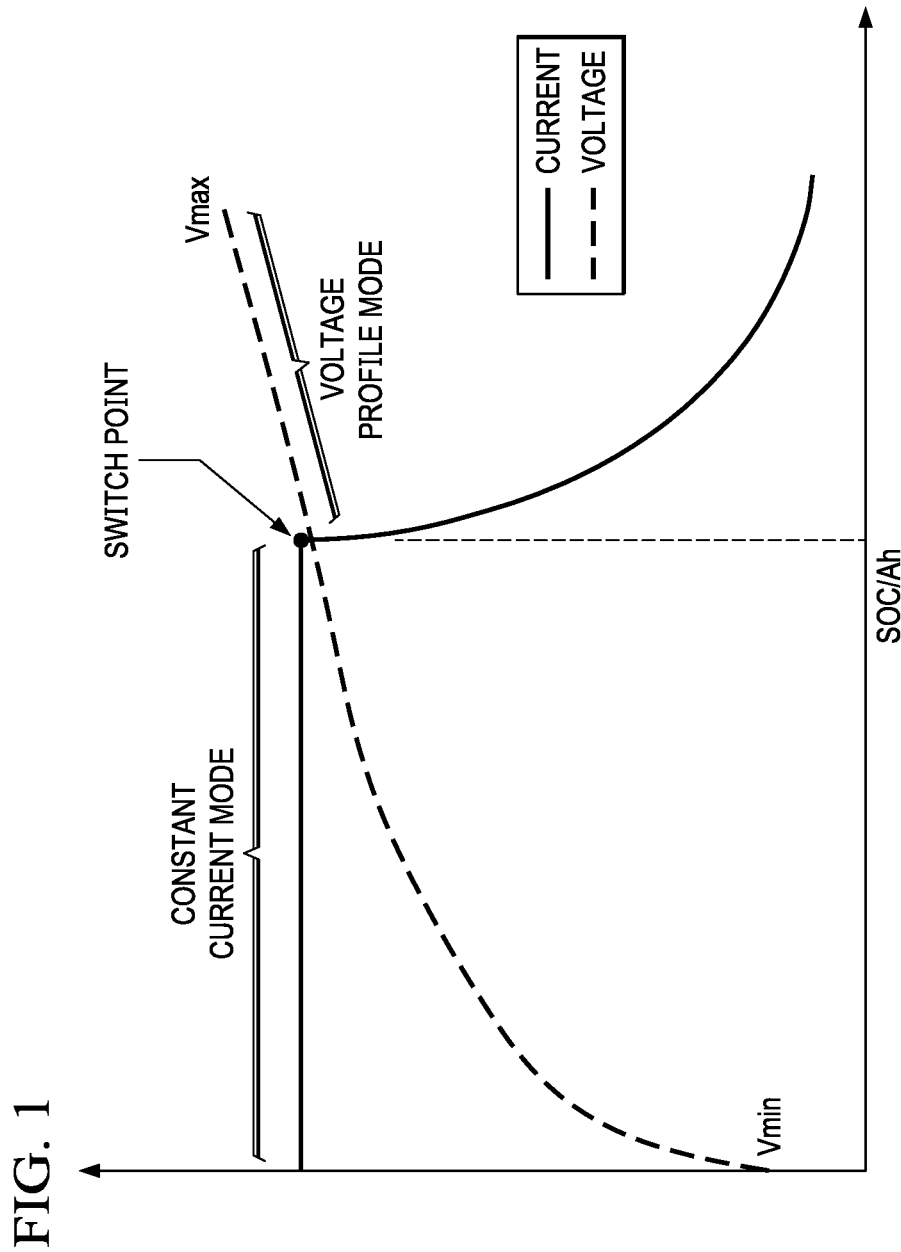
FIG. 1 illustrates an example of a charging profile in accordance with the invention.

FIG. 1 illustrates an example of a charging profile for charging a lithium-ion battery. The charging profile has been determined in accordance with the method described herein.

The charging begins with a constant current charging phase and continues with constant current charging until the SOC reaches a predetermined switch point. At that time, the charging becomes an increasing voltage phase, with increasing voltage until the battery is fully charged or a maximum charging voltage, Vmax, is reached.

Figure 2:
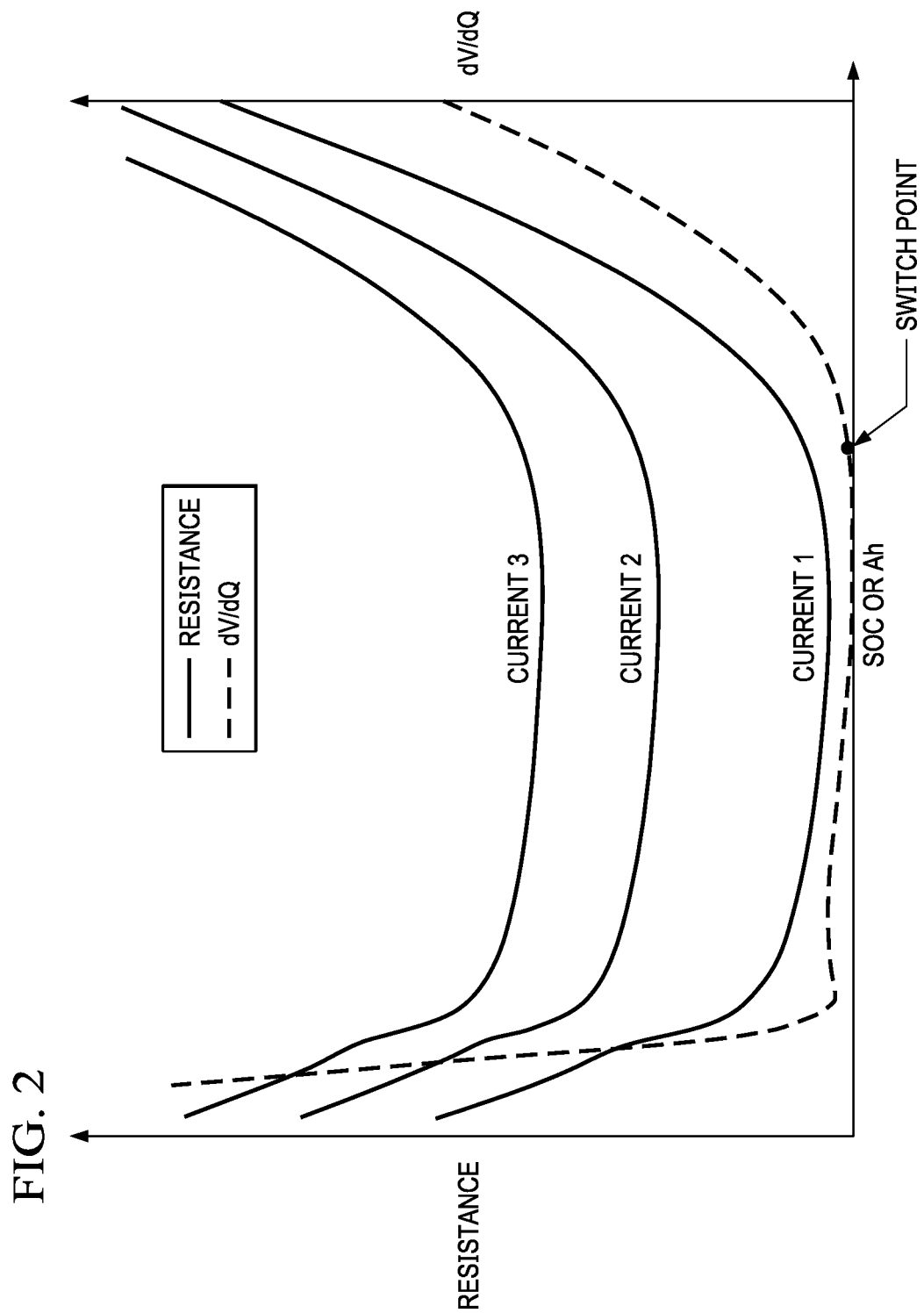
FIG. 2 illustrates how the constant current level and switch point for the charging profile are determined.
Figure 3:
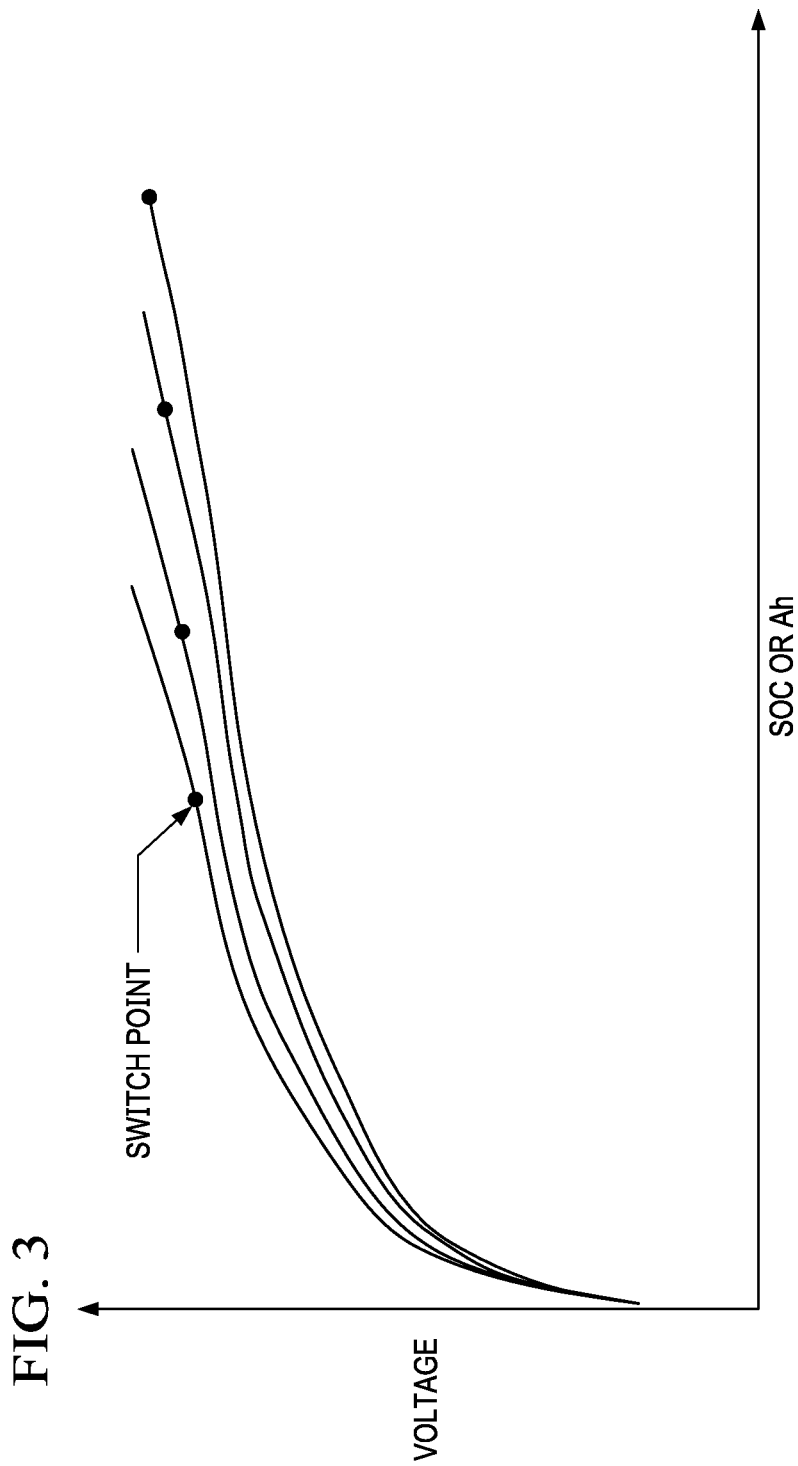
FIG. 3 illustrates how the increasing voltage for the charging profile is determined.

FIGS. 2 and 3 illustrate how the current level for constant current charging, the switch point, and the rate of increasing voltage (voltage profile) are selected. This is an ex-situ process, performed for a particular lithium-ion battery and others of the same type, e.g., having the same attributes. Once a charging profile such as the one illustrated in FIG. 1 has been developed, the charging profile can be programmed into the battery's battery management system or other charging equipment.

FIG. 2 illustrates how the current level for the constant current charging phase and the switch point are determined. Various current levels (Current 1, Current 2, and Current 3) are potential candidates, with the selection typically being based on a tradeoff between the C rate and resistance.

As illustrated, at various constant current levels, the resistance drops and then increases as the SOC increases. Constant current charging is typically performed at a constant current of between 0.5 and 1.0 C rate. The battery voltage rises as charging progresses.

Each current level will have a different dv/dQ plot, with one dV/dQ plot being illustrated as an example. In general, as the SOC increases, the dV/dQ is generally flat (plateaued) and then experiences a sharp rise.

Analysis of dV/dQ (differential voltage analysis) is used as an indicator of battery charge acceptance. Optimal charge acceptance occurs with an increase in charge (dQ) while the voltage rise (dV) is minimal.

The selected current level is a current level having a dV/DQ plot that balances a low plateau value while also minimizing resistance. This is considered to be an optimal balance between resistance and charge acceptance.

For the selected current, the switch point is selected at the SOC at which the dV/dQ curve suddenly begins to increase in slope.

Referring to FIG. 3, after a current level and switch point are selected, the voltage profile for charging after the switch point is determined. Tracking a gentle voltage rise in closed loop mode can be used to find a balance between charge acceptance and charge time.

Figure 4:
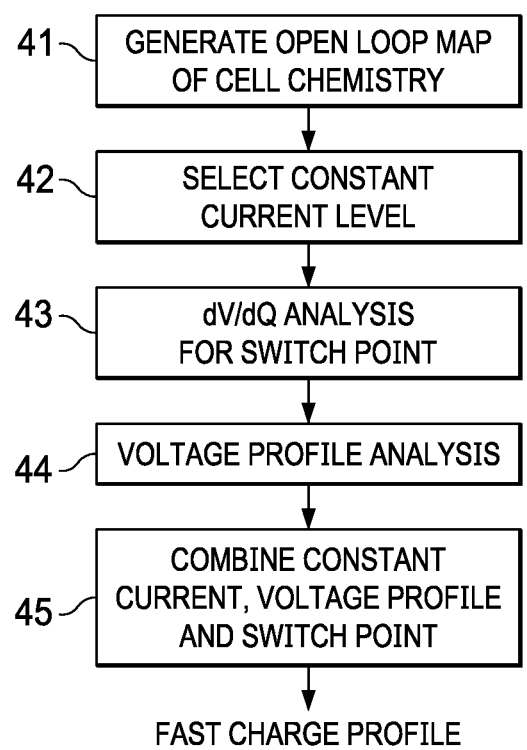
FIG. 4 illustrates a method of determining a charging profile.

FIG. 4 illustrates a method for determining a charging profile for a lithium-ion battery. It should be understood that different battery chemistries may result in different constant current levels, switch points, and voltage profiles. Thus, the charging profile will be different for different types of batteries.

Step 41 is collecting cell chemistry data. Although the charging profile will be different for different batteries, the method of FIG. 4 is agnostic to the type of lithium-ion chemistry. It is expected to be applicable to all cathode chemistry variants.

Step 42 is selecting the current level for the constant current phase of charging. Referring to FIG. 2 and the accompanying description, this achieved by finding a current level that optimally balances charge acceptance and resistance.

Step 43 is performing a dV/dQ analysis on the current selected in Step 42. As described above, the dV/dQ plot for a particular current will reveal a switch point where constant current charging is to be switched to increasing voltage charging.

Step 44 is selecting a voltage charging rate for charging after the switch point. As described above in connection with FIG. 3, the charging voltage rate is determined as a balance between charge time and charge acceptance.

Step 45 is combining the results of Steps 42, 43, and 44 to generate the charging profile. This profile consists of the selected constant current for early charging, a switch point at a predetermined SOC, followed by an increasing voltage charging phase.

For a particular battery, its charging profile may be first determined at the beginning of the battery life. The determination of a charge profile can be repeated at various stages of a battery's aging. The result is a series of charge profiles over time.

A battery's charging profile (or set of profiles over its life) can be programmed into a battery management system or other charging equipment associated with the battery.

What is claimed is:

1. A method of determining a charging profile for lithium-ion battery, comprising:
    selecting a constant current level for a first phase of charging;
    wherein the constant current level is selected on the basis of battery resistance during charging and differential voltage (dV/dQ) analysis;
    selecting a switch point at a state of charge (SOC) of the battery on the basis of when dV/dQ values increase;
    selecting an increasing voltage charging rate after the switch point;
    wherein the increasing voltage rate is selected on the basis of battery charge acceptance and charge time; and
    combining the constant current level, the switch point, and the increasing voltage rate to generate a charging profile.

2. The method of claim 1, wherein the method is performed at the beginning of life of the battery.

3. The method of claim 1, wherein the method is performed at different stages of life of the battery.

4. The method of claim 1, wherein the battery has an associated battery management system and further comprising programming the charging profile into the battery management system.

* * * * *